UNITED STATES PATENT OFFICE.

ARTHUR T. HINCKLEY, OF NIAGARA FALLS, NEW YORK, ASSIGNOR TO NATIONAL CARBON COMPANY, INC., A CORPORATION OF NEW YORK.

CARBONACEOUS MATERIAL AND PROCESS OF MAKING SAME.

1,317,498.   Specification of Letters Patent.   Patented Sept. 30, 1919.

No Drawing.   Application filed June 24, 1919. Serial No. 306,376.

*To all whom it may concern:*

Be it known that I, ARTHUR T. HINCKLEY, a citizen of the United States, residing at Niagara Falls, in the county of Niagara and State of New York, have invented certain new and useful Improvements in Carbonaceous Materials and Processes of Making Same, of which the following is a specification.

This invention relates to a novel product prepared from anthracite or similar hard coals and a carbonaceous binder, and to processes of making the same.

Hard coals of the anthracite type have been used heretofore in the manufacture of electrodes and other carbon articles, the process usually employed consisting essentially in subjecting the coal in lump form to calcination at high temperatures, up to 1600–1800° C., crushing and grading the product, mixing the particles with a pitch or tar binder, shaping the electrode or other article, and finally baking it at a sufficient temperature, usually around 1000° C., to coke the binder.

For such purposes coals of the anthracite type present certain defects, among which are non-uniformity of electrical and thermal conductivity, strength, and other physical properties along different planes of the particle; and the existence of definite cleavage planes along which fracture most readily occurs. These defects exist in the coal both before and after calcination. It results therefrom that bonded articles prepared as above described do not exhibit uniform physical properties (electrical and thermal conductivity, strength, resistance to strains and stresses set up during heating and cooling, etc.) in all their parts and in all directions; and moreover articles prepared in the same way from the same materials may present material differences in respect to these and other physical characteristics, in accordance with the particular position which the component particles may assume in the mass.

According to the present invention I overcome these difficulties by preparing from anthracite or similar hard coals fabricated particles of which the physical properties are practically uniform in all directions or planes, and which are free from all tendency to fracture along cleavage planes. My preferred procedure is as follows; it being understood that my invention is not limited to the employment of the particular operating conditions below specified:

The anthracite coal is first ground, preferably to a very fine powder, for example 45% to pass a screen having 200 meshes to the linear inch. This powder is then mixed with pitch or other heavy hydrocarbon, the latter preferably in about the minimum proportion in which it is capable of serving as an efficient binder for the mass. 12 to 15% of pitch will serve this purpose, the mixing being done in suitable mechanical devices or kneaders at a high temperature, say about 160° C. The mass thus prepared is then shaped under high pressure and preferably at a high temperature, for example in a steam-heated hydraulic press. The shaped article or product is then baked at about 1000° C. The baked article, which may be more or less warped or cracked, is then crushed and graded into particles of a size appropriate for the intended use. Such particles may for example be used in the manufacture of electrodes to be graphitized, as disclosed for instance in my copending application Serial No. 282,040, filed March 11, 1919.

It will be noted that in the process as above described the anthracite is powdered and bonded before being subjected to a shrinking operation; and that the shrinking of the anthracite is effected simultaneously with the coking of the hydrocarbon binder. This procedure has proven in practice to be highly advantageous for several reasons. In the first place the breaking down of the pitch or other carbonaceous binder, and also of the coal, seems to take place in such a manner that practically the whole of the carbon component of both materials remains in the product as evidenced by the fact that the loss of weight during the baking corresponds approximately at least to the content, in the raw materials, of the fixed gases, hydrogen, nitrogen and oxygen. Furthermore, and presumably by reason of the above, the product is of relatively low porosity, usually in the neighborhood of 13–15%, as compared with 20% or more in the case of fabricated particles made from anthracite coal which was first calcined or shrunk in lump form, and thereafter ground to the same degree of fineness, and bonded and baked in the manner described above. However the product formed by either of these methods possesses the substantial uniformity of physical and electrical properties along all planes, the attainment of which is one of the principal objects of this invention; and both classes of particle may be used for the manufacture of carbon articles in accordance with this invention.

Such carbon articles may be manufactured by any appropriate method, as for example by mixing the suitably graded fabricated particles, with or without other forms of carbon, with a carbonaceous binder; shaping the material, and baking the product at about 1000° C. The article so prepared may of course be graphitized at higher temperatures if desired.

The fabricated particles prepared as above from raw anthracite coal with a hard pitch bond, and baked to 1000° C., are as stated very much more resistant to crushing and other stresses than are similar particles produced directly from electrically calcined anthracite. The following comparative test will suffice to illustrate this:—

Electrically calcined anthracite coal in the form of particles having an average diameter of 0.24" was subjected to a steady crushing pressure of 1500 lbs. per square inch, for unit time, and broke down to particles having an average diameter of 0.146", an average decrease of approximately 39%. Under precisely the same conditions the average decrease in diameter of the fabricated particles was only 13%, the initial average diameter of 0.24" falling to 0.218" under the same test conditions.

Raw petroleum coke, while free from the cleavage tendency exhibited by anthracite, is cellular in structure, and may advantageously be treated according to the process as herein described; that is to say, it may be finely powdered without previous calcination, bonded, baked, and the baked material crushed and graded to form fabricated particles of the desired size. Hence the term "hard coal", as used in the claims, is intended to include raw petroleum coke. The fabricated particles made from petroleum coke may be used alone, or in admixture with fabricated particles prepared from anthracite coal; or if desired, the petroleum coke and the anthracite, both in the form of fine powder, may be used together in the manufacture of fabricated particles.

I claim:—

1. A fabricated carbon particle consisting essentially of the commingled residues from the calcination or baking of pulverized hard coal and a carbonaceous binder, said particle substantially uniform in physical properties in all planes.

2. A fabricated carbon particle consisting essentially of the commingled residues from the simultaneous calcination or baking of pulverized hard coal and a carbonaceous binder, said particle substantially uniform in physical properties in all planes.

3. Process of making a fabricated carbon particle suitable for the manufacture of carbon articles, comprising commingling powder derived from hard coal with a carbonaceous binder, shaping the material, baking the resulting article at a coking temperature, and then subdividing the baked product.

4. Process of making a fabricated carbon particle suitable for the manufacture of carbon articles, comprising pulverizing hard coal, commingling the resulting powder with a carbonaceous binder, shaping the material, baking the resulting article at a coking temperature, and then subdividing the baked product.

5. A carbon article comprising fabricated carbon particles and a coked binder, said fabricated carbon particles comprising the commingled residues from the calcination or baking of pulverized hard coal and a carbonaceous binder, and being substantially uniform in physical properties in all planes.

6. A carbon article comprising fabricated carbon particles and a coked binder, said fabricated carbon particles comprising the commingled residues from the simultaneous calcination or baking of pulverized hard coal and a carbonaceous binder, and being substantially uniform in physical properties in all planes.

In testimony whereof, I affix my signature.

ARTHUR T. HINCKLEY.